United States Patent [19]

Kubota

[11] 4,364,088

[45] Dec. 14, 1982

[54] APPARATUS FOR INSPECTING WHETHER AN OBJECT IS GOOD OR BAD

[75] Inventor: Yutaka Kubota, Odawara, Japan

[73] Assignee: Stanley Electric Co., Tokyo, Japan

[21] Appl. No.: 215,139

[22] Filed: Dec. 10, 1980

[30] Foreign Application Priority Data

Dec. 12, 1979 [JP] Japan .............................. 54-161149

[51] Int. Cl.³ .............................................. H04M 7/18
[52] U.S. Cl. ...................................... 358/106; 356/23
[58] Field of Search ................. 358/106, 107, 206, 93, 358/100, 101; 356/23, 372, 388, 394

[56] References Cited

U.S. PATENT DOCUMENTS 4,305,658 12/1981 Yoshida ............................... 358/106

FOREIGN PATENT DOCUMENTS 2041693 9/1980 United Kingdom ................ 358/206

Primary Examiner—Robert L. Griffin
Assistant Examiner—Edward L. Coles

[57] ABSTRACT

An apparatus for inspecting whether an object is good or bad includes a video camera picking up an object to be inspected a stroboscope radiating the object, a detector for detecting a predetermined inspection position of the object and producing a position signal when the object arrives at the predetermined inspection position, a circuit for receiving the position signal from the position detector and producing a signal to flash the stroboscope, a circuit for receiving an output from the video camera and for inspecting whether the object is good or bad, a separator for separating a synchronizing signal from a composite video signal from the video camera, and a circuit for making the electron beam of the video camera OFF at latest before receiving the position signal from the position detector and making the electron beam ON and starting the inspecting operation of the inspecting circuit when receiving the synchronizing signal.

4 Claims, 7 Drawing Figures

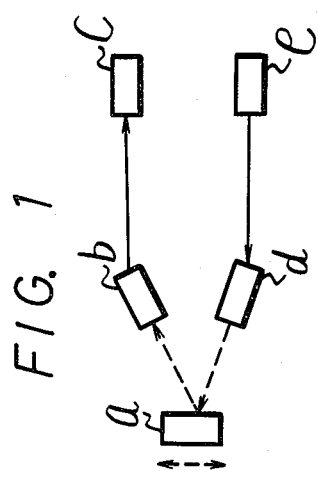
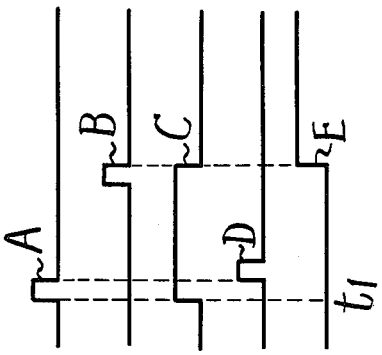
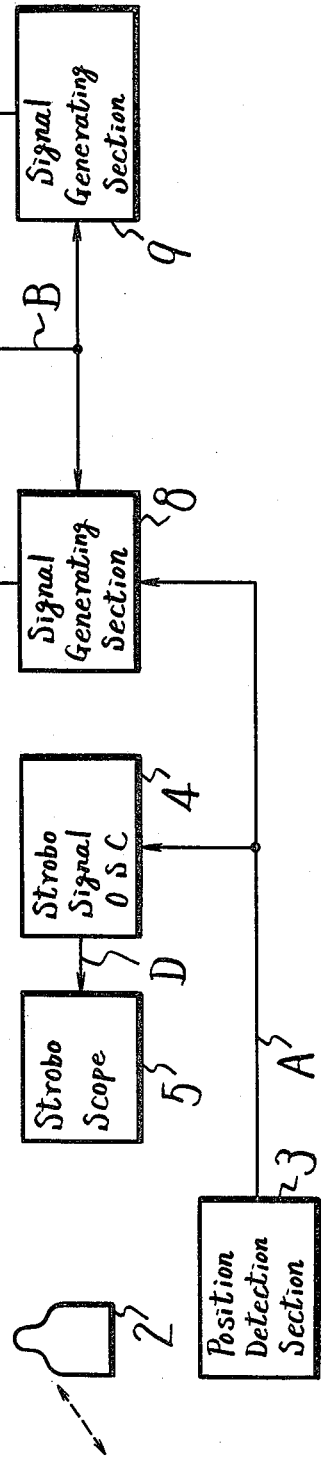

APPARATUS FOR INSPECTING WHETHER AN OBJECT IS GOOD OR BAD

BACKGROUND OF THE INVENTION

1. Field of the Invention

The present invention relates to systems which judge the good or bad of objects to be inspected by their image signals from a television or video camera that picks up or photosenses the objects transported, for example, on conveyer belts or the like as static images when a stroboscope is flashed, whereas the electron beam of the video camera is made off before or simultaneous to the stroboscope flash.

2. Description of the Prior Art

Systems that judge the good or bad of an inspected object by shape irregularities are known as pattern recognition systems. Such systems are mainly used to segregate defective objects which produce irregular shape or pattern among the many similar shaped objects by a manner that, for instance, such objects, which are transferred on belt conveyers or the like, are picked up by a television camera in the same direction and are taken as a static image by utilizing a stroboscope flash on the object, whereas such image signal from the television camera is processed to provide the above mentioned judgement.

FIG. 1 illustrates such a conventional judgement system by block diagram, whereas a is a moving object, and the system is constructed by a television camera b which photosenses the object a, a monitor or a signal processing section c, a stroboscope station or lamp d that is used to secure a static image of the moving object a for camera b and an oscillator e to flash the stroboscope lamp d, by which the consecutively moving objects a are photosensed by camera b to produce a video or image signal which is processed at the monitor or the signal processing section c. However, in the illustrated conventional system, since the system does not contain any means for synchronizing the stroboscope flash timing with the television camera in spite of the fact that it is used to obtain a static image of the object a, it is difficult to take a matched timing for the image signal processing. For instance, when the stroboscope lamp d flashes on the way during the horizontal scanning of the television camera b, if the horizontal scanning is about around the midway of one field, the lower half image signal of object a is output first from camera b, which is then followed by a second image signal by the upper horizontal scanning. Accordingly, some methods or means will be necessary to recognize that these 2 image signals express one object a. To this end, for instance, a stroboscope flash timing control circuitry or the like becomes necessary and hence the stroboscope system becomes extremely complicated.

OBJECTS AND SUMMARY OF THE INVENTION

Accordingly, it is an object of the present invention to provide a novel apparatus for judging whether an object to be inspected is good or bad.

Another object of the invention is to provide an apparatus for judging whether an object to be inspected is good or bad free from the defect encountered in the prior art.

A further object of the invention is to provide an apparatus for judging whether an object to be inspected is good or bad using an television camera, a lamp radiating the object and a processor such as a computer processing the video signal of the object from the camera in which a timing circuitry is provided such that the lamp is flashed when the object arrives at a predetermined detecting position, the scanning electron beam of the television camera is made OFF prior or simultaneous to the flash of the lamp and the video signal is delivered from the camera and processed at any desired time or in synchronism with the synchronizing signal of the composite video signal delivered from the camera.

According to an aspect of the present invention, an apparatus for inspecting whether an object is good or bad is provided which comprises:

(a) a video camera picking up an object to be inspected;

(b) a stroboscope radiating said object;

(c) detecting means for detecting a predetermined inspection position of said object and producing a position signal when said object arrives at said predetermined inspection position;

(d) means for receiving the position signal from said position detecting means and producing a signal to flash said stroboscope;

(e) means for receiving an output from said video camera and for inspecting whether said object is good or bad;

(f) means for separating a synchronizing signal from a composite video signal from said video camera; and (g) means for making the electron beam of said video camera OFF at latest before receiving the position signal from said position detecting means and making the electron beam ON and starting the inspecting operation of said inspecting means when receiving the synchronizing signal.

The additional objects, features and advantages of the present invention will become apparent from the following description taken in conjunction with the accompanying drawings.

BRIEF DESCRIPTION OF THE DRAWINGS

FIG. 1 illustrates a block diagram of the conventional systems;

FIG. 2 illustrates a block diagram showing an example of this invention, and

FIGS. 3A–E illustrates a time chart of the main parts in FIG. 2.

DESCRIPTION OF PREFERRED EMBODIMENT

Details of an example of the apparatus of the present invention will be explained hereunder in reference to the drawings. On FIG. 2, 1 is a television or video camera which picks up or photosenses an object 2 to be inspected which is carried by, for example, a belt conveyor one after another, 3 is a position detection section which consists of a lamp and a photo-cell and outputs a position signal upon detecting that the object 2 has arrived at a predetermined position to be normally picked up by video camera 1, 4 is a strobo signal oscillator section which outputs a strobo flash signal to flash a stroboscope 5 when it receives the position signal from the position detection section 3, and 6 is an image signal processing section such as a computer which processes the static image of object 1 as photosensed by the video camera 1 upon the flash of stroboscope 5 and, for example, has such a function to judge whether the shape of object 2 contains any irregularities or not based upon the static image signal of object 2 as output from camera 1.

Further, in FIG. 2, 7 is a vertical synchronizing signal separation section which receives the composite video signal from the camera 1 and separates therefrom the vertical synchronizing signal. The vertical synchronizing signal from the section 7 and the position signal from the section 3 are both applied to a signal generating section 8 which then generates an ON-OFF signal for making the scanning electron beam of video camera 1 ON and OFF. The vertical synchronizing signal from the section 7 is also applied to another signal generating section 9 which then generates a signal to start the operation of the section 6 or for the section 6 to start the processing of the video signal from the video camera 1. In detail, the section 8 has such a function to work on the camera 1 at the same time when it receives the position signal from the position detection section 3 to make the electron beam of the video camera 1 OFF. In other words, video camera 1 does not output the video signal of object 2 whose pattern is memorized on the target screen of cameral 1 upon the flash of stroboscope 5 at the same time. The timing to make the beam of the video camera 1 OFF may be conducted as aforementioned at the same time when the stroboscope 5 is flashed or otherwise, before the stroboscope 5 is flashed. In either case, however, since according to the invention the video signal is not output from the camera 1 at the same time that the stroboscope 5 is flashed, there is the advantage that the process timing of the video signal can be established easy as will be described later.

As the next step, the function of the present invention will be explained in reference with FIGS. 3A to 3E. When object 2 moves and arrives at the predetermined detection position at a time t$_1$, the position detection section 3 detects the same and supplies a position signal A shown in FIG. 3A to the oscillator section 4 and generating section 8. Thus, a beam-off signal C, which rises up in synchronism with the rising-up edge or position signal A and falls down at the falling-down edge of the vertical synchronizing signal (described later) as shown in FIG. 3C, is output from the signal generating section 8 and fed to the camera 1 to make the beam of the video camera 1 OFF. On the other hand, a stroboscope flash signal D, which rises up in synchronism with the falling-down edge of position signal A and falls down soon as shown in FIG. 3D, is output from the section 4 and fed to the stroboscope 5 to flash it, so that the image or pattern of object 2 is projected and memorized on the target screen of video camera 1.

The vertical synchronizing signal separated by the section 7 from the composite video signal of video camera 1 after the flash of stroboscope 5 is shown in FIG. 3B at B, and the signal produced by the section 9 is shown in FIG. 3E at E which in this example is arranged to rise up at the falling-down edge of the vertical synchronizing signal B. The signal C is in other words a signal to make the beam of the video camera 1 OFF and the signal E can start the operation of section 6 which signals C and E both synchronize with the falling-down edge of the vertical synchronizing signal B. Therefore, because the image read-out can be done from the camera 1 and the processing for the read-out signal from the camera 1 can be initiated at any desired time or in synchronism with the vertical synchronizing signal B in this example, there is the advantage that the desired process timing for the video signal at image processing section 6 may be established as desired.

In the above example, the signal generating sections 8 and 9 produce the signals C and E at the same time when they respectively receive the first vertical synchronizing signal B from the section 7. However, the sections 8 and 9 are each counters and have such a function that they produce the signals C and E when they receive a desired number of the vertical synchronizing signals B, for example, three vertical synchronizing signals B.

As above explained, since the present invention segregates the photosensing of an object by the video camera and the read-out or output of the same therefrom, by which the read-out may be conducted by the synchronization to a desired vertical synchronizing signal, the image signal is not output from the video camera on the half way of horizontal scanning thereof and always forms a complete image in one field. Therefore, it is not necessary to introduce any timing control to the stroboscope flashing and the system may be simplified.

Further, since the read-out of an object pattern as memorized on the video camera may be synchronized with a desired vertical synchronizing signal, there is the advantage that the read-out timing from the video camera may be established as desired. This means that when image signals of objects are to be judged for good or bad at the image processing section, the image processing timing may be established as desired and there is no restriction to the timing of the processing the video signal of the object which provides an effect that the operation is simplified.

It will be apparent that many modifications and variations could be effected by one skilled in the art without departing from the spirits or scope of the novel concepts of the present invention.

I claim as my invention:

1. An apparatus for inspecting whether an object is good or bad comprising:
  (a) a video camera for picking up an object to be inspected;
  (b) a stroboscope for radiating said object;
  (c) detecting means for detecting a predetermined inspection position of said object and producing a position signal when said object arrives at said predetermined inspection position;
  (d) means for receiving the position signal from said position detecting means and for producing a signal to flash said stroboscope;
  (e) means for receiving an output from said video camera and for inspecting whether said object is good or bad;
  (f) means for separating a synchronizing signal from a composite video signal derived from said video camera; and
  (g) means for making the electron beam of said video camera OFF at the latest before receiving the position signal from said position detecting means and then making the electron beam ON when receiving the synchronizing signal after said position signal and starting the inspecting operation of said inspecting means.

2. An apparatus as claimed in claim 1, wherein said last-mentioned means includes a first signal generating means which produces a signal to make the electron beam of said video camera OFF and ON and a second signal generating means which produces a signal to start the inspection operation of said inspecting means in synchronism with the ON of said video camera.

3. An apparatus as claimed in claim 1, wherein said separating means separates the vertical synchronizing signal from the composite video signal of said video camera.

4. An apparatus for inspecting whether an object is good or bad comprising:
   (a) a video camera for picking up an object to be inspected;
   (b) a stroboscope for radiating said object;
   (c) detecting means for detecting a predetermined inspection position of said object and producing a position signal when said object arrives at said predetermined inspection position;
   (d) means for receiving the position signal from said position detecting means and for producing a signal to flash said stroboscope;
   (e) means for receiving an output from said video camera and for inspecting whether said object is good or bad;
   (f) means for separating a synchronizing signal from a composite video signal from said video camera;
   (g) means for making the electron beam of said video camera OFF at the latest before receiving the position signal from said position detecting means and making the electron beam ON when receiving the synchronizing signal from said synchronizing signal separating means after said position signal; and
   (h) means for producing a signal to start the inspection operation of said inspecting means when receiving the synchronizing signal.

* * * * *

UNITED STATES PATENT AND TRADEMARK OFFICE
CERTIFICATE OF CORRECTION

PATENT NO. : 4,364,088
DATED : December 14, 1982
INVENTOR(S) : Yutaka KUBOTA

It is certified that error appears in the above-identified patent and that said Letters Patent are hereby corrected as shown below:

Title page, item [73] should read:

Assignee:--Stanley Electric Co., Tokyo, Japan and
Hajime Industries, Ltd., Tokyo, Japan--.

Signed and Sealed this

Twenty-ninth Day of November 1983

[SEAL]

Attest:

GERALD J. MOSSINGHOFF

Attesting Officer     Commissioner of Patents and Trademarks